April 23, 1957 W. W. BEAVER 2,789,880
SELECTIVE CHLORINATION OF BERYL
Filed Sept. 23, 1954
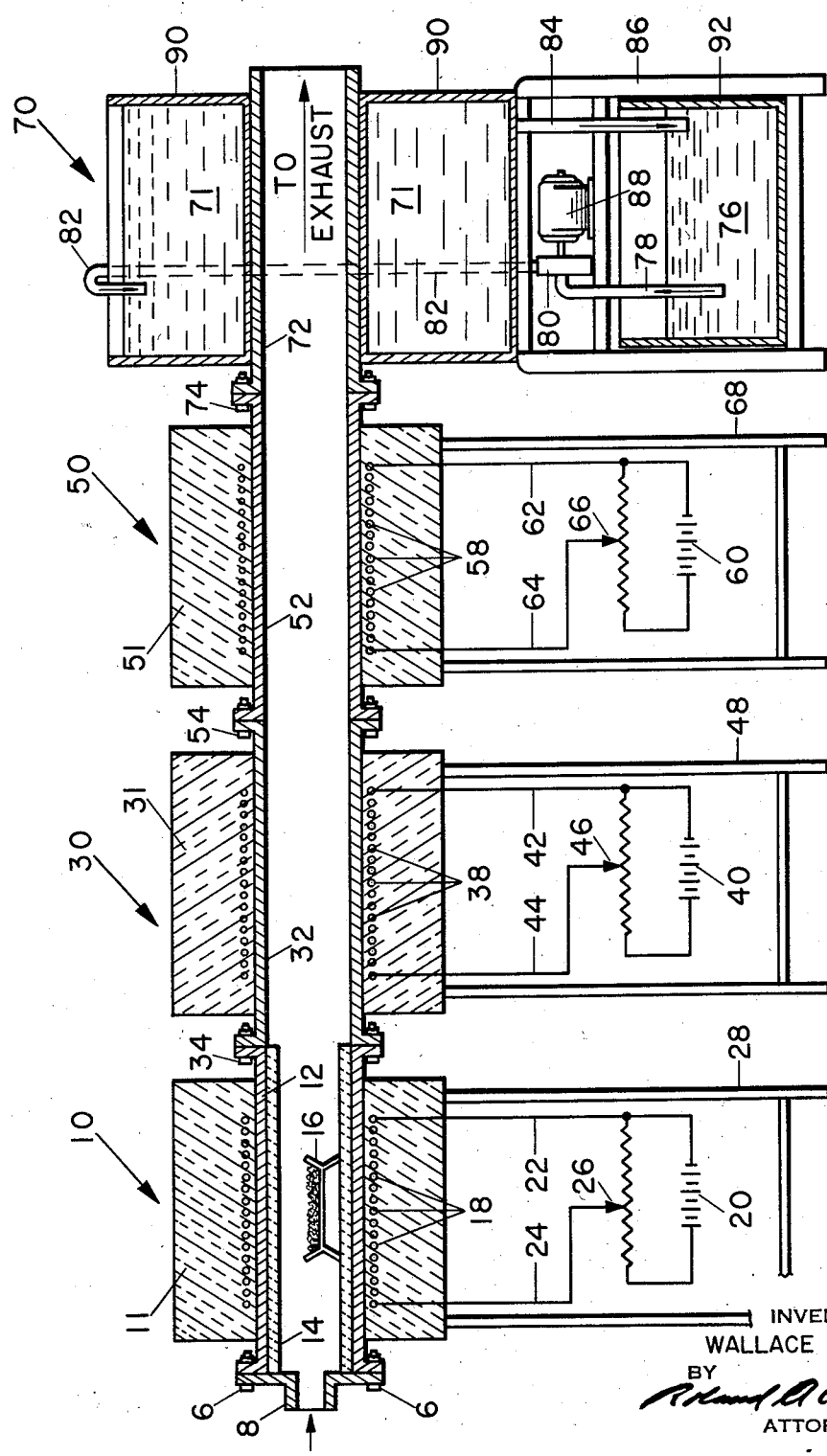
INVENTOR
WALLACE W. BEAVER
BY
ATTORNEY United States Patent Office
2,789,880
Patented Apr. 23, 1957

2,789,880

SELECTIVE CHLORINATION OF BERYL

Wallace W. Beaver, South Euclid, Ohio, assignor, by mesne assignments, to the United States of America as represented by the United States Atomic Energy Commission Application September 23, 1954, Serial No. 458,033

5 Claims. (Cl. 23—16)

The present invention relates to a process for selectively chlorinating beryl ore.

Beryl is a silicate of beryllium and aluminum and is the only beryllium ore of general importance. A process for the production of beryllium chloride by direct chlorination of beryllium has been described. However by the known direct chlorination process the other metals of beryl, principally aluminum and silicon, are also chlorinated. The aluminum chloride and silicon tetrachloride may be separated from the beryllium chloride by passing them through a tube heated to a temperature of 375° C. Under these conditions the beryllium chloride, which has a boiling point of 520° C., condenses in the tube while chlorides of aluminum, having a sublimation point of 178° C., and silicon, having a boiling point of 57.6° C., pass through.

By following this known process the chlorides can be separated, once they are formed, according to their difference in their condensation temperature. However the known process is not selective in the formation of the chlorides in that the ratio of the metal chlorides produced by the known process is about the same as that in the ore. The theoretical formula for beryl may be expressed as follows: $3BeO, Al_2O_3, 6SiO_2$, i. e., 14% BeO, 19% $Al_2O_3$ and 67% $SiO_2$. In nature these proportions are not adhered to strictly, the BeO varying from 5% to 13% with corresponding variations in the percentages of the other constituents. It is obvious that a process which selectively chlorinates the beryllium oxide component of the beryl ore will provide advantages over one which produces a chloride product wherein the beryllium is in substantially the same percentage concentration as it is in the ore itself.

The known process for direct chlorination of beryl ore has been described as involving the crushing and grinding and mixing together of beryl ore with carbon, briquetting the mixture, and direct chlorination of the briquettes. The chlorides formed as a result of this described chlorination process are in approximately the same proportions as are the metals in the ore.

The present method is essentially an improvement over the described procedure, the improvement being that according to the present method a higher concentration of beryllium is found in the chlorides produced by direct chlorination as compared with the beryllium concentrates present in the beryl ore from which the chlorides are formed. According to the present procedure, beryl ore having a low percentage of beryllium is chlorinated to yield a volatile chloride mixture which has a much higher percentage of beryllium and for this reason the beryl ore is said to be selectively chlorinated, i. e., so as to favor removal of beryllium from the beryl ore preferentially to the removal of other metal therefrom. This results in an improved yield of beryllium chloride for the chlorine expended or, in other words, a greater efficiency of chloride consumption. This is a very important factor because, as is noted above, beryllium is present in beryl ore to the extent of only 5% to 13% and its chlorination thus requires only $\frac{1}{20}$ to $\frac{1}{8}$ the chlorine needed for complete chlorination. In addition, since the chloride effluents have a higher percentage of beryllium chloride, the separation of the metal chloride components by condensation or otherwise is made more efficient since there is smaller concentration of interfering chlorides.

It is accordingly one object of the present invention to provide a method for selective chlorination of beryl ore.

Another object of the present invention is to provide a method of more efficiently chlorinating beryl ore.

Other objects will be in part apparent and in part pointed out hereinafter.

In one of its broader aspects, the present method comprises treating a mixture of beryl ore and carbon with chlorine within preferred ranges of a combination of factors including temperature, weight ratio of carbon to beryl, weight ratio of chlorine to beryl, and rate of delivery of chlorine to the beryl. A preferred temperature range is between 1400 and 1500° C., slightly below the sintering or fusion temperature of the carbon-beryl mixture. A preferred range of weight ratio of carbon to beryl is in excess of 1. A preferred range of weight ratio of chlorine to beryl is between 1.6 and 2 and a preferred range of rate of delivery of chlorine to the beryl-carbon mixture is between 0.2 and 3.3 grams of chlorine per gram of beryl ore per hour. It will be apparent from the description and examples of the method which follow that selective chlorination can be achieved at other values of the individual factors and that such achievement of selective chlorination within the broader ranges of the individual factors is within the scope of the present method.

The process of the present invention may be conveniently carried out in an apparatus such as that illustrated in the drawing, which is an elevational view, in part sectional and in part diagrammatic, of a heating and condensing apparatus suitable for carrying out the method of the present invention.

The apparatus consists of four sections 10, 30, 50 and 70. In the first section 10 the beryl ore-containing material is chlorinated at a high temperature in order to form volatile chlorides. In the remaining sections 30, 50 and 70 a temperature control apparatus is provided so that these sections may be maintained at different temperatures in order to separately condense the chlorides evolved in the first section. This separation makes possible the determination of the composition of the chlorides produced by the chlorination of the beryl ore-containing material in the first section. It will be apparent that the described apparatus is one form of apparatus in which the method of the present invention may be carried out although it will be realized that numerous other forms of apparatus are also suitable for carrying out the present method.

With reference to the illustrated apparatus, the beryl-containing material is chlorinated in the high temperature section 10. During such chlorination the beryl is preferably contained in a perforated dish 16, which is located within a liner 14 in the high temperature furnace 11. Both the dish 16 and the liner 10 are preferably made of carbon in order to withstand the chemical action of chlorine at the high temperature created within the furnace 11. An outer sleeve 12, composed of a material capable of resisting oxidation at high temperature such as silicon carbide, may be employed to protect the liner 14 from oxidation by the atmosphere external to the furnace core. A metal pipe 8 composed of a material such as nickel which is resistant to the action of chlorine and terminating in a flange is preferably attached to a flanged end of the sleeve 12 to provide an inlet for the supply of chlorine to the furnace core. The two confronting flanges may be held together by means of the bolts 6 after the dish 16 has been introduced into the furnace. Heat is supplied to the furnace by the heating elements 18 enclosed in the insulated walls of the furnace 11. A current source 20 supplies heating current to the elements 18 through the electrical leads 22 and 24 and rheostat 26. The rheostat 26 permits adjustment of the temperature of the furnace to a desired level. The furnace is supported on a stand 28. A flange at the right end of the sleeve 12 confronts a corresponding flange on the left end of the similar sleeve 32. Bolts 34 may be employed to secure these flange ends together.

The high temperature condensing section 30 is employed to separately condense from the mixture of chlorides passing therethrough the chloride having the highest boiling point, namely, beryllium chloride. In this section a furnace 31, similar to the furnace 11 of section 10, supplies heat to the core of sleeve 32. This sleeve is preferably made of some material resistant to the chemical attack of chlorine gas, as for example, nickel. Heat in this furnace is generated by means of the heating elements 38, current being supplied to these elements from the current source 40 through the electrical leads 42 and 44 and the rheostat 46. Rheostat 46 permits adjustment of the temperature within the core of the sleeve 32. The furnace 31 is supported on a suitable stand 48. The sleeve terminates at its right end in a flange which is bolted by means of bolts 54 to the corresponding confronting flange on the left end of a similar sleeve 52.

The chloride having the next higher boiling point, namely, aluminum chloride is separately collected in the sleeve 52 by maintaining the temperature of this sleeve below the boiling point of this chloride and above the boiling point of the next most volatile chloride. The sleeve 52 is positioned within a furnace 51 in section 50 of the illustrated apparatus. This sleeve is also preferably composed of a material such as nickel which is resistant to the chemical attack of chlorine gas. Heat is supplied to the core of the sleeve by heating elements 58. The current to heat these elements is supplied from a current source 60 through electrical leads 62 and 64 and rheostat 66. Rheostat 66 permits adjustment of the temperature within the core of sleeve 52 to a temperature below that at which aluminum chloride condenses. Furnace 51 is supported on the conventional stand 68. The sleeve 52 terminates at its right end in a flange which may be secured to a corresponding confronting flange of a sleeve 72 by the bolts 74.

The internal surface of sleeve 72 is maintained at such a temperature as will condense the silicon chloride evolved by the chlorination of the beryl-containing material. Such temperature is achieved by surrounding this sleeve with a coolant bath 71, such as a bath of Dry Ice and alcohol. This bath is maintained within a container 90 and a reservoir container 92. A reservoir 76 of the Dry Ice-alcohol slurry may be kept within this latter container. Circulation of the slurry between the two containers may be provided by means of the pump 80 actuated by a motor 88 and causing an upward flow of slurry from the reservoir 76 to the bath 71 through the pipes 78 and 82. A return of the slurry from the bath 71 to the reservoir 76 occurs through the return pipe 84.

From the foregoing it can be seen that an apparatus, such as that described, may be employed to chlorinate the beryl-containing material in a high temperature section 10 and to separately condense the evolved chlorides in the sections 30, 50 and 70 depending on the different condensation temperatures of the chlorides. It will be realized that the apparatus as shown is a diagrammatic illustration of one suitable for carrying out the present method but that the method may be satisfactorily carried out in numerous other apparatus or modifications of that illustrated in the figure. For example, while suitable temperatures may be maintained in the region of the sleeves not jacketed by a furnace, due to heat conduction along the sleeves, it is apparent that relative lengths of the sleeves and furnaces may be adjusted to provide adequate temperatures.

In carrying out the chlorination it is necessary to maintain certain variables within critical limitation in order to obtain selective chlorination while other variables may be subject to less critical control. One variable which must be carefully controlled is the range of weight ratio of carbon to beryl. As noted earlier this ratio is preferably at least one although ratios greatly in excess of one will be wasteful of chlorine gas. The form of carbon which may be mixed with the beryl is not so limited. Thus one may use petroleum coke, commercial graphite, ground electrode carbon, activated charcoal or sugar charcoal or other forms of carbon to achieve the same effect. In carrying out the present method the carbon is preferably pulverized and blended with beryl ore which has been crushed and screened so that at least 80% passes through a 200 mesh screen. The particle size of the beryl and carbon should preferably be of comparatively small size and of the same order of magnitude.

The blended carbon and beryl are preferably pelletized prior to chlorination but a number of procedures are suitable so long as the resultant weight ratio of carbon to beryl is in the desired range. One suitable procedure is the blending of pulverized carbon and beryl and the pilling of the blended mixture by standard pharmaceutical pill making procedure. While this procedure is satisfactory, a procedure which limits the amount of dust which may be produced is one by which the pulverized beryl and carbon are slurried in water and a sugar such as glucose is added to the slurry. The resultant material is dried at about 110° C. and broken up into pellets or particles preferably ranging between ¼ and ⅜ inch diameter. The pellets are then introduced into the heating section 10 of the apparatus and heated to about 600° C. in a protective flow of argon for about 12 hours. This heating carbonizes the sugar and renders the material suitable for chlorination.

Material prepared by either these or similar procedures and having a carbon to beryl weight ratio of at least 1 may be heated in section 10 of the apparatus after the inlet pipe 8 has been secured in position. According to the preferred procedure after the preliminary heating is complete, the temperature of this section is raised to the desired chlorinating temperature while flowing a protective atmosphere of inert gas such as helium over the mixture. Introduction of the chlorine or other chlorinating gas is started after the material has been raised to the desired chlorinating temperature. According to the preferred procedure, chlorine is then flowed into contact with the mixture at a delivery rate of between 0.2 and 3.3 grams of chlorine per gram of beryl ore per hour. During this chlorination the metal chlorides produced are separately condensed in the condensing section 30, 50 and 70 of the apparatus. After approximately 1.6 to 2 grams of chlorine have been passed into contact with the beryl-containing material for each gram of beryl in the mixture, the chlorination is terminated.

The following examples are illustrative of the selectivity which has been achieved in carrying out the present method in apparatus similar to that shown in the figure although, as will be understood, the concept of the present method is not limited to the illustrative examples given.

*Example 1*

A charge of 500 grams of a pelleted intimate mixture containing beryl, carbon and glucose and having 5 parts of beryl ore for each 4 parts of carbon and having a weight ratio of total carbon to beryl of 1.35 was introduced into a furnace. The furnace was heated first to 600° C. to carbonize the glucose and then to a temperature of about 1500° C. while flowing an atmosphere of inert gas therethrough. After reaching temperature, elemental chlorine was flowed through the furnace at about 1 cubic foot per hour and the chlorination was continued for about 4½ hours, so that the weight ratio of chlorine to beryl was approximately 1.6. The beryllium, silicon and aluminum chlorides evolved were separately collected. It was found that 78% of the beryllium content of the beryl was chlorinated, no silicon was chlorinated and 46.6% of the aluminum was chlorinated.

*Example 2*

A charge of 370 grams of a pelleted intimate mixture containing beryl, carbon and glucose was introduced into a furnace. The mixture contained 100 parts of beryl ore for each 11.1 parts of carbon and the total carbon to beryl content of the mixture was in a weight ratio of 0.285. The mixture was heated first to 600° C. and then to a temperature of about 1500° C. in an inert atmosphere after which approximately 1.8 cubic feet per hour of chlorine was passed into contact with the mixture for a period of 4 hours. The weight ratio of chlorine to beryl was approximately 2.0 at the end of this period. Separate collection of the chloride products of this chlorination revealed that 50.2% of beryllium was chlorinated, 18.8% of the silicon and 23.2% of the aluminum were chlorinated.

*Example 3*

70 grams of a pelleted intimate mixture containing beryl, carbon and sucrose and containing 100 parts of beryl for each 70 parts of carbon were introduced into a furnace and heated first to 600° C. and then to approximately 1500° C. in a protective gas atmosphere. The ratio of total carbon to beryl was 0.885. When the mixture had reached the higher temperature chlorine gas was passed into contact with the mixture at a flow rate of 1.4 cubic feet per hour for about 2 hours. The weight ratio of chlorine so passed, to the beryl contacted, was 6.5. Separate collection of the metal chlorides evolved indicated that 63% of the beryllium was chlorinated, 42.0% of the silicon was chlorinated and 47.7% of the aluminum was chlorinated.

*Example 4*

A charge of 100 grams of beryl and carbon mixture containing a carbon to beryl ratio of 1 was introduced into a furnace and heated to a temperature of approximately 1450° C. in an inert atmosphere. Phosgene gas was introduced into the furnace at a flow rate of approximately 1 cubic foot per hour for approximately 2 hours. The weight ratio of the total carbon to beryl was approximately 1.82 and the weight ratio of chlorine to beryl was approximately 4.0. Separate collection of the metal chlorides evolved indicated that 43.4% of the beryllium, 18.6% of the silicon and 7.9% of the aluminum were chlorinated.

From the foregoing it was apparent that carrying out the direct chlorination of beryl according to the present method results in the selective chlorination of beryl ore in that it makes possible the chlorination of the beryllium component of the beryl in higher percentages than the other metal components.

It is also apparent that while the greatest selectivity may be achieved within a combination of preferred ranges of the factors of temperature, weight ratio of carbon to beryl, weight ratio of chlorine to beryl, and rate of delivery of chlorine to beryl, valuable selectivity can also be achieved although individual factors are varied over the broader ranges illustrated by the foregoing examples.

Since many embodiments might be made of the above described invention and since many changes might be made in the embodiments illustratively disclosed herein, it is to be understood that the matter hereinabove set forth is to be interpreted as illustrative only and not in a limiting sense, except as may be required by the appended claims.

I claim:
1. The method of selective chlorination of beryl ore which comprises forming an intimate mixture of pulverulent beryl ore and carbon, the weight ratio of said carbon to beryl ore being in excess of 1, passing a gas containing reactive chlorine into contact with said mixture at a rate of between 0.2 and 3.3 grams of chlorine per gram of beryl ore per hour while maintaining the temperature of said mixture above 1400° C. and below the sintering temperature thereof until the weight ratio of chlorine passed into contact with the mixture to the beryl therein is of the order of 2 and collecting the volatile chloride products of said chlorination.

2. The method of selective chlorination of beryl ore which comprises forming an intimate mixture of pulverulent beryl ore and carbon, the weight ratio of said carbon to beryl ore being in excess of 1, passing a gas containing elemental chlorine into contact with said mixture at a rate of between 0.2 and 3.3 grams of chlorine per gram of beryl ore per hour while maintaining the temperature of said mixture above 1400° C. and below the sintering temperature thereof until the weight ratio of chlorine passed into contact with the mixture to the beryl therein is between 1.6 and 2 and collecting the volatile chloride products of said chlorination.

3. The method of selective chlorination of beryl ore which comprises forming an intimate mixture of pulverulent beryl ore and carbon, the weight ratio of said carbon to beryl ore being in excess of 1, passing chlorine into contact with said mixture at a rate of between 0.2 and 3.3 grams of chlorine per gram of beryl ore per hour while maintaining the temperature of said mixture at about 1500° C. until the weight ratio of chlorine passed into contact with the mixture to the beryl therein is between 1.6 and 2 and collecting the volatile chloride products of said chlorination.

4. The method of selective chlorination of beryl ore which comprises forming an intimate mixture of pulverulent beryl ore, at least 80% of which has a particle size less than 200 mesh, and carbon, the weight ratio of said carbon to beryl ore being in excess of 1, passing chlorine into contact with said mixture at a rate of between 0.3 and 3.3 grams of chlorine per gram of beryl ore per hour while maintaining the temperature of said mixture about 1500° C. until the weight ratio of chlorine passed into contact with the mixture to the beryl therein is between 1.6 and 2 and collecting the volatile chloride products of said chlorination.

5. The method of selective chlorination of beryl ore which comprises forming a slurry of finely divided beryl ore, at least 80% of which is less than 200 mesh, and finely divided carbon in an aqueous solution containing 20% sugar, drying the slurry at approximately 110° C., breaking the dried mixture into particles of small diameter, heating the particular mixture in an inert atmosphere at 600° C. for approximately 12 hours, thereafter heating said mixture to approximately 1500° C. and passing chlorine gas into contact therewith at a rate of between 0.2 and 3.3 grams of chlorine per gram of beryl ore per hour until the weight ratio of chlorine passed into contact therewith to the beryl therein is between 1.6 and 2.0 and collecting the volatile chloride products of said chlorination.

References Cited in the file of this patent

UNITED STATES PATENTS

| | | |
|---|---|---|
| 1,392,046 | Booth et al. | Sept. 27, 1921 |
| 2,270,502 | Bucher | Jan. 20, 1942 |
| 2,635,036 | Rogers | Apr. 14, 1953 |